United States Patent
Kim et al.

(10) Patent No.: US 12,503,097 B2
(45) Date of Patent: Dec. 23, 2025

(54) APPARATUS FOR AND METHOD OF CONTROLLING ENERGY FOR HYBRID ELECTRIC VEHICLE

(71) Applicants: Hyundai Transys Inc., Seosan-si (KR); Auburn University, Auburn, AL (US)

(72) Inventors: Jin Seong Kim, Hwaseong-si (KR); Song Yul Choe, Auburn, AL (US); Kyung Jin Yu, Auburn, AL (US)

(73) Assignees: Hyundai Transys Inc., Seosan-si (KR); Auburn University, Auburn, AL (US)

( * ) Notice: Subject to any disclaimer, the term of this patent is extended or adjusted under 35 U.S.C. 154(b) by 200 days.

(21) Appl. No.: 18/452,286

(22) Filed: Aug. 18, 2023

(65) Prior Publication Data
US 2024/0336253 A1  Oct. 10, 2024

(30) Foreign Application Priority Data
Apr. 5, 2023 (KR) .......... 10-2023-0044657

(51) Int. Cl.
*B60W 20/11* (2016.01)
*B60W 10/06* (2006.01)
(Continued)

(52) U.S. Cl.
CPC .......... *B60W 20/11* (2016.01); *B60W 10/06* (2013.01); *B60W 10/08* (2013.01); *B60W 20/13* (2016.01);
(Continued)

(58) Field of Classification Search
CPC ...... B60W 20/11; B60W 10/06; B60W 10/08; B60W 20/13; B60W 2710/244;
(Continued)

(56) References Cited

U.S. PATENT DOCUMENTS

2015/0202990 A1\* 7/2015 Grossard ............... G06Q 50/06
701/22

FOREIGN PATENT DOCUMENTS

KR         100873688 B1    12/2008
KR    10-2016-0036032 A    4/2016
(Continued)

OTHER PUBLICATIONS

Office Action dated Dec. 4, 2024 in Korean Application No. 10-2023-0044657.

*Primary Examiner* — Brian P Sweeney
(74) *Attorney, Agent, or Firm* — SALIWANCHIK, LLOYD & EISENSCHENK (57) ABSTRACT

An apparatus for and a method of controlling energy for a hybrid electric vehicle. The apparatus includes an input module receiving a traveling condition and a vehicular characteristic of the vehicle, a memory storing an execution program and a parameter that are necessary for carrying out an energy management strategy, and a processor operatively coupled to the input module and the memory, wherein the processor receives the traveling condition and the vehicular characteristic through the input module, according to the energy management strategy, and then determines, based on a first control algorithm, whether or not the vehicle is drivable in an EV mode, wherein, when the vehicle is drivable, the processor enables the vehicle to drive in the EV mode, and wherein, when the vehicle is not drivable, the processor determines and outputs a drive mode and a torque distribution ratio based on a second control algorithm.

18 Claims, 6 Drawing Sheets

(51) Int. Cl.
  *B60W 10/08* (2006.01)
  *B60W 20/13* (2016.01)
(52) U.S. Cl.
  CPC ... *B60W 2710/244* (2013.01); *B60W 2720/40* (2013.01)
(58) Field of Classification Search
  CPC .. B60W 2720/40; B60W 20/15; B60W 20/20; B60W 2510/244; B60W 2710/083; B60Y 2200/92; Y02T 10/62
  See application file for complete search history.

(56) References Cited

FOREIGN PATENT DOCUMENTS

| KR | 10-2019-0142369 | A |   | 12/2019 |     |           |
|----|-----------------|---|---|---------|-----|-----------|
| KR | 10-2022-0027308 | A |   | 3/2022  |     |           |
| KR | 10-2022-0082121 | A |   | 6/2022  |     |           |
| KR | 10-2023-0010074 |   | * | 1/2023  | ... | B60W 20/13 |
| KR | 20230010074     | A |   | 1/2023  |     |           |
| WO | WO2018104850    | A1| * | 6/2018  | ... | B60W 20/11 |

\* cited by examiner

| Control method | Control parameters | Value |
|---|---|---|
| RB | $rb_{dod}$ | 33.1 |
| | $rb_{trq}$ | 76.3 |
| NMPC | $w_{fuel}$ | 148.2 |
| | $w_{SR}$ | 631.5 |
| | $w_{soc}$ | $f(time)$ |
| | $w_{constraint}$ | 1000 |

FIG. 3

| Control method | Control parameters | Value |
|---|---|---|
| RB | $rb_{dod}$ | 34.5 |
| | $rb_{trq}$ | 50 |
| NMPC | $w_{fuel}$ | 55.3 |
| | $w_{SR}$ | 947.8 |
| | $w_{soc}$ | $f(time)$ |
| | $w_{constraint}$ | 1000 |

FIG. 4

| Vehicle model | Cycle | Control algorithm | RB (Auto.) | NMPC | RB-NMPC | DP |
|---|---|---|---|---|---|---|
| P0P2 | UDDS | FE/ mpg | 36.5 | 32.2 | 38.2 | 49.6 |
| | | $CO_2$ emission / g/mile | 242.7 | 275.1 | 231.4 | 178.5 |
| | | $Q_{loss}$/Ah | $6.86×10^{-4}$ | $6.15×10^{-4}$ | $5.44×10^{-4}$ | $6.73×10^{-4}$ |
| | HWFET | FE/ mpg | 35.1 | 34.2 | 35.8 | 40.6 |
| | | $CO_2$ emission / g/mile | 252.5 | 259.1 | 247.1 | 218.0 |
| | | $Q_{loss}$/Ah | $5.91×10^{-4}$ | $6.03×10^{-4}$ | $4.61×10^{-4}$ | $5.51×10^{-4}$ |
| P1P2 | UDDS | FE/ mpg | 38.8 | 36.4 | 42.8 | 59.2 |
| | | $CO_2$ emission / g/mile | 278.0 | 244.3 | 208.4 | 149.7 |
| | | $Q_{loss}$/Ah | $6.55×10^{-4}$ | $4.27×10^{-4}$ | $5.07×10^{-4}$ | $7.53×10^{-4}$ |
| | HWFET | FE/ mpg | 35.2 | 34.1 | 36.3 | 43.1 |
| | | $CO_2$ emission / g/mile | 251.9 | 259.4 | 244.3 | 205.4 |
| | | $Q_{loss}$/Ah | $6.35×10^{-4}$ | $2.08×10^{-4}$ | $2.89×10^{-4}$ | $8.76×10^{-4}$ |

APPARATUS FOR AND METHOD OF CONTROLLING ENERGY FOR HYBRID ELECTRIC VEHICLE

CROSS-REFERENCE TO RELATED APPLICATION

This application claims the benefit of Korean Patent Application No. 10-2023-0044657, filed on Apr. 5, 2023, the disclosure of which is incorporated by reference herein in its entirety.

BACKGROUND

Field

Exemplary embodiments of the present disclosure relate to an apparatus for and a method of controlling energy for a hybrid electric vehicle and, more particularly, to an apparatus for and a method of controlling energy for a hybrid electric vehicle, the apparatus and the method being capable of improving performance of the hybrid electric vehicle by distributing an output resulting from considering fuel efficiency of the hybrid electric vehicle and battery degradation, using two-layer rule-based control and a model predictive control algorithm.

Discussion of the Background

Generally, a hybrid electric vehicle (HEV) employs a structure complex due to the use of two or more power sources, such as a motor and an engine. Therefore, an energy management strategy (EMS) for determining distribution of outputs of various power sources has a significant influence on performance of a hybrid electric apparatus.

A goal of the EMS here is to optimize fuel efficiency while ensuring that the EMS is carried out within a maximum operating range of each component of the hybrid electric vehicle and to reduce the real-time computation complexity.

EMS technologies are categorized into three types: rule-based, optimization-based, and learning-based.

Firstly, the RB-EMS is the simplest real-time applicable technique based on a pre-defined rule.

Secondly, the OB-EMSs are categorized into two types according to the complexity of information required and computation into two types: online and offline. The offline OB-EMSs include dynamic programming (DP), a genetic algorithm (GA), a Pontryagin's minimum principle (PMP), particle swarm optimization (PSO), and the like. Information needs to be provided to the offline OB-EMS from when the hybrid electric vehicle starts to travel to when the hybrid electric vehicle comes to a complete stop. For this reason, the offline OB-EMS can apply in real time, but produces the most optimal result.

The online OB-EMSs include an equivalent consumption minimization strategy (ECMS), model predictive control (MPC), and nonlinear model predictive control (NMPC) which are applicable in real time.

Thirdly, the LB-EMS is an online-applicable data-based learning technique. With developments in artificial intelligence technology, extensive research has been conducted on the LB-EMS.

In addition, as a next-generation EMS solution, techniques, as a hybrid EMS, that are created by combining rule-based, optimization-based, and learning-based technologies have been proposed.

However, an energy management strategy for the hybrid electric vehicle (HEV-EMS) mostly considers solely fuel efficiency. Additionally, the EMS that considers battery degradation mitigation uses low-precision battery model that has not been experimentally verified.

The battery models here are categorized into an electric equivalent circuit model (ECM) and a full order electro-chemical model (FOM).

The ECM is the simplest battery model in which a battery is assumed to be a circuit configured with a resistor and a capacitor and is mostly used for the energy management strategy.

In contrast, the FOM is composed of complex equations, including equations of higher order, based on principles of electrochemical, thermodynamic, and physical phenomena inside the battery. The FOM considers the phenomena inside the battery with the highest precision, but has high complexity.

Therefore, a reduced order electrochemical model (ROM) that is obtained by simplifying a nonlinear equation of higher order through a numerical interpretative method has been proposed.

The ROMs here are categorized into a pseudo two dimensional (ROM-P2D) and a single particle model (ROM-SPM). The ROM-SPM considers solely one particle, while the ROM-P2D considers multiple particles at positive and negative poles.

In addition, a ROM-P2D-SPM model that is configured by setting the SPM at the positive pole and the P2D at the negative pole has been developed.

A solid electrolyte interphase (SEI) layer, which is a main cause of battery degradation, is formed on surfaces of particles at the negative pole through a side reaction. For this reason, in order to predict a reaction inside the negative pole with high precision, the P2D setting applies at a negative pole, and the SPM setting applies at a positive pole, thereby reducing the model complexity.

Therefore, the ROM-P2D-SPM model has a shorter computation time than the ROM-P2D and can predict the battery degradation with higher precision than the ROM-SPM.

However, methods that precisely predict a battery degradation phenomenon using an energy management strategy considering both the fuel efficiency and the battery degradation, along with the ROM-P2D or the ROM-SPM, have not been applied.

The related art of the present disclosure is disclosed in Korean Patent No. 10-0873688 (published on Dec. 5, 2008 and entitled "METHOD FOR TORQUE ALLOCATION AND CONTROL OF A HYBRID DRIVE").

SUMMARY

Various embodiments are directed to an apparatus for and a method of controlling energy for a hybrid electric vehicle, the apparatus and the method being capable of distributing an output resulting from considering fuel efficiency of the hybrid electric vehicle and battery degradation, using a two-layer rule-based control and a model predictive control algorithm. This distribution not only satisfies a safe operating condition of constituent elements of the hybrid electric vehicle, but also precisely predicts and optimizes the battery degradation by applying a ROM-P2D-SPM that is a battery degradation model. As a result, fuel consumption can be minimized, and the battery degradation and computation time can be reduced.

In an embodiment, an apparatus for controlling energy for a hybrid electric vehicle includes: an input module configured to receive a traveling condition and a vehicular characteristic of the hybrid electric vehicle, as inputs; a memory configured to store an execution program and a parameter that are necessary for carrying out an energy management strategy; and a processor operatively coupled to the input module and the memory, wherein the processor receives the traveling condition and the vehicular characteristic, as the inputs, through the input module, according to the energy management strategy, and then determines, based on a first control algorithm, whether or not the hybrid electric vehicle is drivable in an EV mode, wherein, in a case where the hybrid electric vehicle is drivable in the EV mode, the processor enables the hybrid electric vehicle to drive in the EV mode, and wherein, in a case where the hybrid electric vehicle is not drivable in the EV mode, the processor determines and outputs a drive mode and a torque distribution ratio based on a second control algorithm.

In an embodiment, in the apparatus, the hybrid electric vehicle may employ one of an in-parallel P0+P2 structure and an in-parallel P1+P2 structure.

In an embodiment, in the apparatus, the first control algorithm may be a rule-based (RB) control algorithm, and the second control algorithm may be an NMPC control algorithm.

In an embodiment, in the apparatus, in a case where a battery's SoC value has never been lower than a control variable $rb_{bod}$ (where the subscript bod stands for depth of discharge) and where a value of a required torque is lower than a control variable $rb_{trq}$ (where the subscript trq stands for torque), the processor may determine that the hybrid electric vehicle is drivable in the EV mode.

In an embodiment, in the apparatus, for a setting purpose, the control variable may be optimized according to the traveling condition based on a genetic algorithm (GA) that is an optimization algorithm, taking into consideration a structure of the hybrid electric vehicle.

In an embodiment, in the apparatus, in a case where a voltage of a battery falls within a preset voltage range, based on the first control algorithm, the processor may enable the hybrid electric vehicle to drive in the EV mode.

In an embodiment, in the apparatus, based on the second control algorithm, the processor may compute the torque distribution ratio through an objective function in which a cost function is minimized, using a ROM-R2D-SPM that is a battery degradation model.

In an embodiment, in the apparatus, the cost function may be a sum of a fuel consumption ratio, a side reaction ratio, an SOC maintenance condition, and a constraint (0 or 1) indicating whether or not an operating range of a constituent element is satisfied.

In an embodiment, in the apparatus, the constituent elements may include one or more of an engine, a torque of a motor, an angular velocity limit of the motor, a battery's SoC, an electric current, and a voltage.

In an embodiment, in the apparatus, the cost function may be computed by multiplying each of the constituent elements by a weighting variable for achieving an importance balance among the constituent elements, the cost function serving to ensure the importance balance among the constituent elements.

In an embodiment, in the apparatus, for a setting purpose, the weighting variable is optimized according to the traveling condition based on a genetic algorithm (GA) that is an optimization algorithm, taking into consideration a structure of the hybrid electric vehicle.

In an embodiment, a method of controlling energy for a hybrid electric vehicle includes: receiving, by a processor, a traveling condition and a vehicular characteristic, as inputs, through an input module, according to an energy management strategy; determining, by the processor, whether or not the hybrid electric vehicle is drivable in an EV mode, based on a first control algorithm; enabling, by the processor, the hybrid electric vehicle to drive in the EV mode in a case where the hybrid electric vehicle is drivable in the EV mode, as a result of determining whether or not the hybrid electric vehicle is drivable in the EV mode; and determining and outputting, by the processor, a drive mode and a torque distribution ratio based on a second control algorithm in a case where the hybrid electric vehicle is not drivable in the EV mode, as a result of determining whether or not the hybrid electric vehicle is drivable in the EV mode.

In an embodiment, in the method, the first control algorithm may be a rule-based (RB) control algorithm, and the second control algorithm may be an NMPC control algorithm.

In an embodiment, in the method, in the determining by the processor of whether or not the hybrid electric vehicle is drivable in the EV mode, in a case where a battery's SoC value has never been lower than a control variable $rb_{bod}$ (where the subscript bod stands for depth of discharge) and where a value of a required torque is lower than a control variable $rb_{trq}$ (where the subscript trq stands for torque), the processor may determine that the hybrid electric vehicle is drivable in the EV mode.

In an embodiment, in the method, for a setting purpose, the control variable may be optimized according to the traveling condition based on a genetic algorithm (GA) that is an optimization algorithm, taking into consideration a structure of the hybrid electric vehicle.

In an embodiment, in the method, in the enabling, by the processor, of the hybrid electric vehicle to drive in the EV mode, in a case where a voltage of a battery falls within a preset voltage range, based on the first control algorithm, the processor may enable the hybrid electric vehicle to drive in the EV mode.

In an embodiment, in the method, in the determining and outputting by the processor of the drive mode and the torque distribution ratio, based on the second control algorithm, the processor computes the torque distribution ratio through an objective function in which a cost function is minimized, using a ROM-R2D-SPM that is a battery degradation model.

In an embodiment, in the method, the cost function may be a sum of a fuel consumption ratio, a side reaction ratio, an SOC maintenance condition, and a constraint (0 or 1) indicating whether or not an operating range of a constituent element is satisfied.

In an embodiment, in the method, the constituent elements may include one or more of an engine, a torque of a motor, an angular velocity limit of the motor, a battery's SoC, an electric current, and a voltage.

In an embodiment, in the method, the cost function may be computed by multiplying each of the constituent elements by a weighting variable for achieving an importance balance among the constituent elements, the cost function serving to ensure the importance balance among the constituent elements.

In an embodiment, in the method, for a setting purpose, the weighting variable may be optimized according to the traveling condition based on a genetic algorithm (GA) that is an optimization algorithm, taking into consideration a structure of the hybrid electric vehicle.

In the embodiments, the apparatus for and the method of controlling energy for a hybrid electric vehicle distribute an output resulting from considering the fuel efficiency of the hybrid electric vehicle and the battery degradation, using a two-layer rule-based control and a model predictive control algorithm. This distribution not only satisfies a safe operating condition of the constituent elements of the hybrid electric vehicle, but also precisely predicts and optimizes the battery degradation by applying the ROM-P2D-SPM that is the battery degradation model. As a result, fuel consumption can be minimized, and the battery degradation and computation time can be reduced.

DETAILED DESCRIPTION OF THE ILLUSTRATED EMBODIMENTS

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

An apparatus for and a method of controlling energy for a hybrid electric vehicle according to the present disclosure will be described below with reference to the accompanying drawings. For clarity and convenience in description, thicknesses of lines, sizes of constituent elements, and the like may be illustrated in a non-exact proportion in the drawings. In addition, terms that hereinafter refer to constituent elements, respectively, according to the present disclosure are defined by considering their respective functions and may vary according to a user's or manager's intention or to practices in the art. Therefore, these terms should be contextually defined in light of the present specification.

Figure 1:
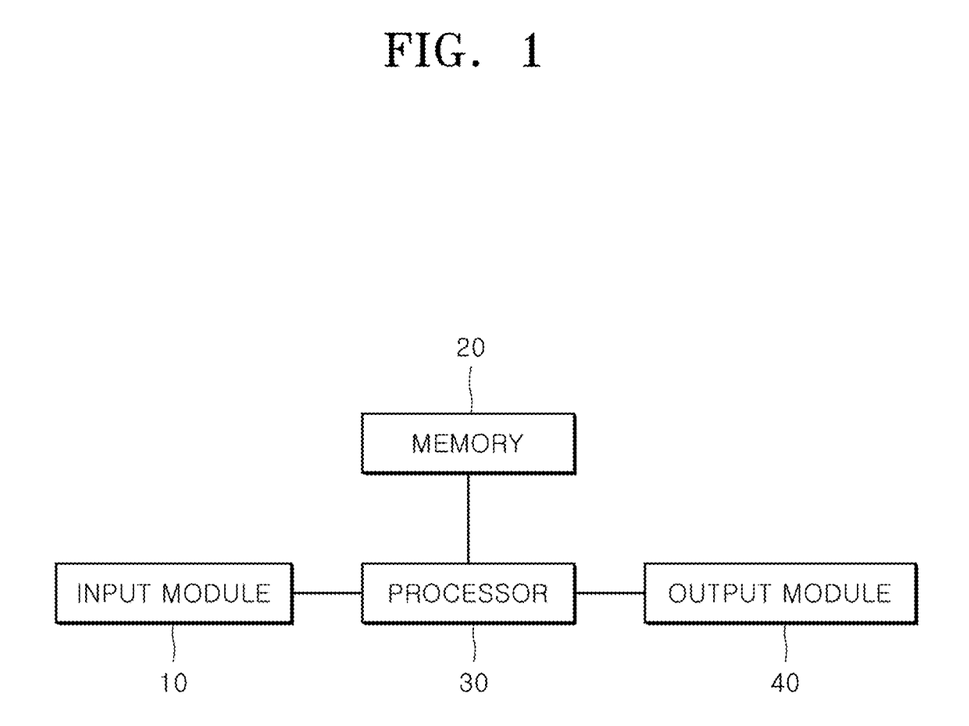
FIG. 1 is a block diagram illustrating a configuration of an apparatus for controlling energy for a hybrid electric vehicle according to a first embodiment of the present disclosure.
Figure 2:
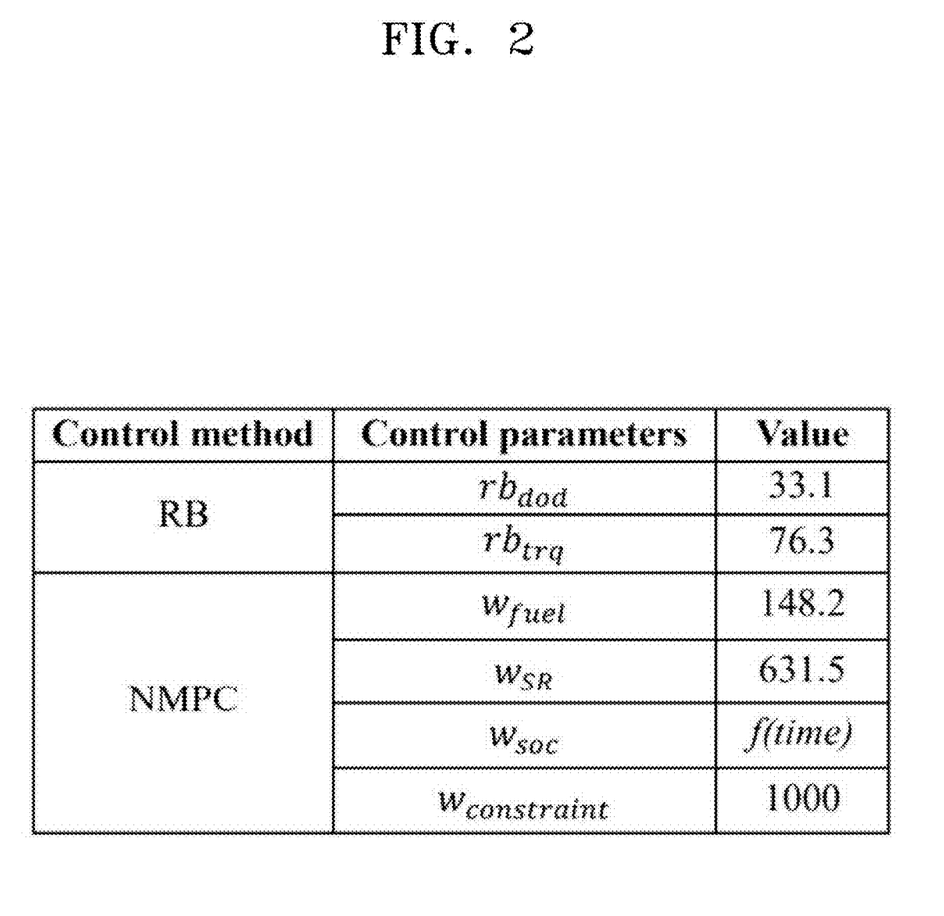
FIG. 2 is a table showing variables optimized for a hybrid electric vehicle employing an in-parallel P0+P2 structure in the apparatus for controlling energy for a hybrid electric vehicle according to the first embodiment.
Figure 3:
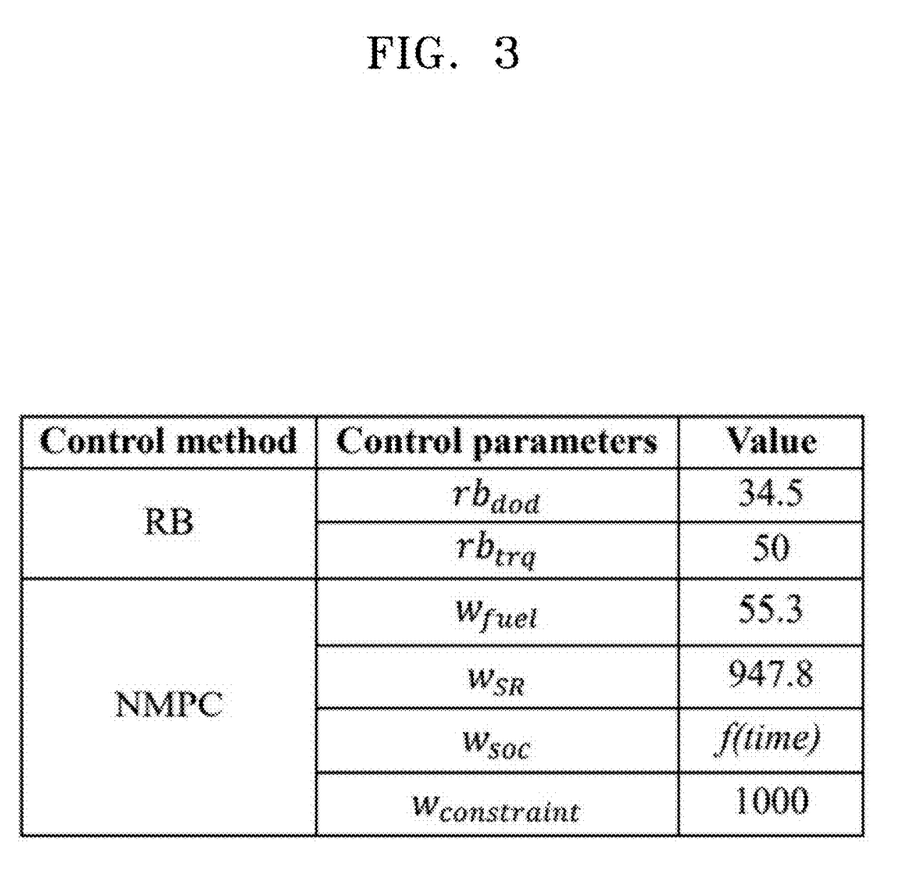
FIG. 3 is a table showing variables optimized for the hybrid electric vehicle employing an in-parallel P1+P2 structure in the apparatus for controlling energy for a hybrid electric vehicle according to the first embodiment.
Figure 4:
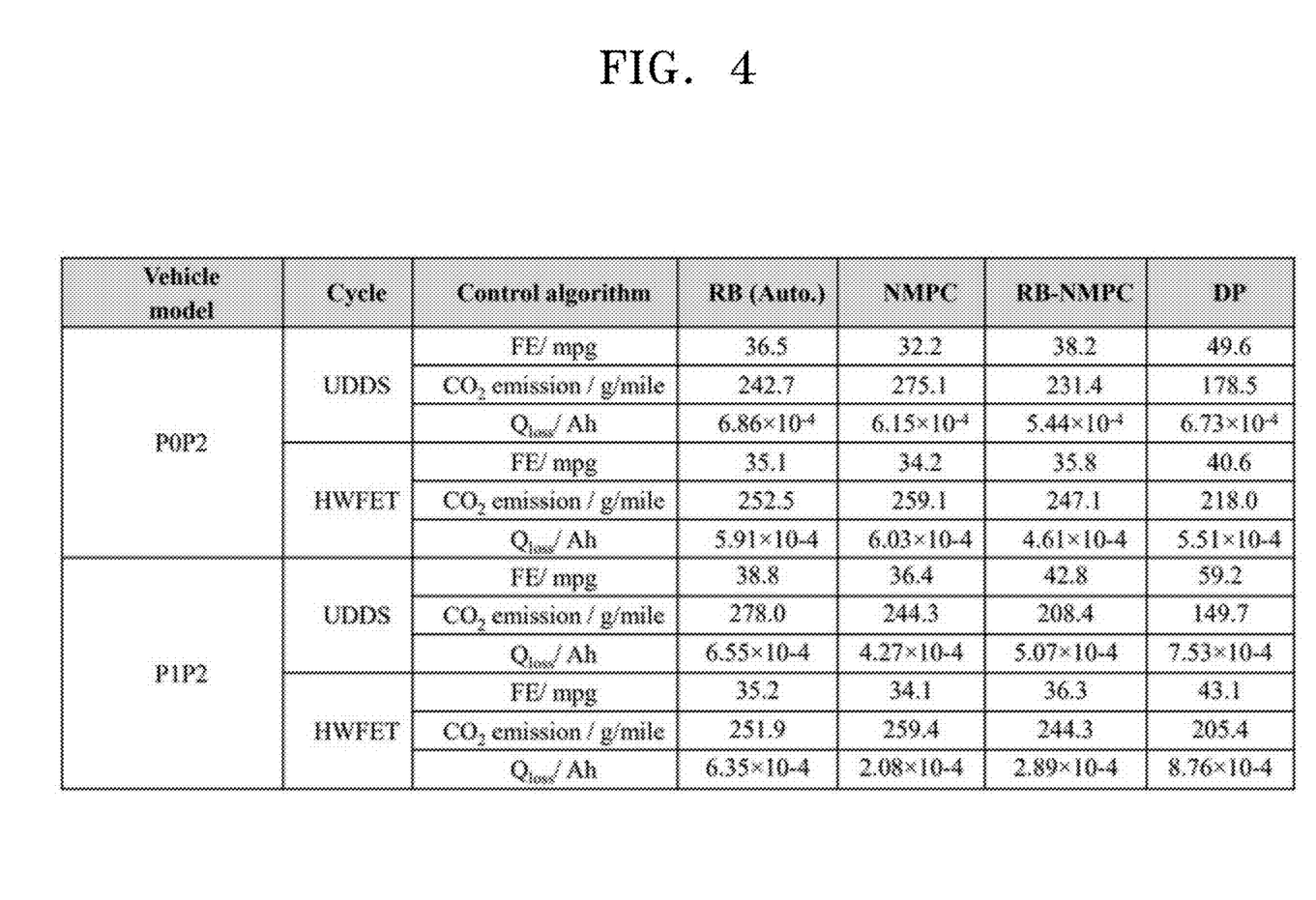
FIG. 4 is a comparative table showing results of simulation of control that is performed by the apparatus for controlling energy for a hybrid electric vehicle according to the first embodiment.
Figure 5:
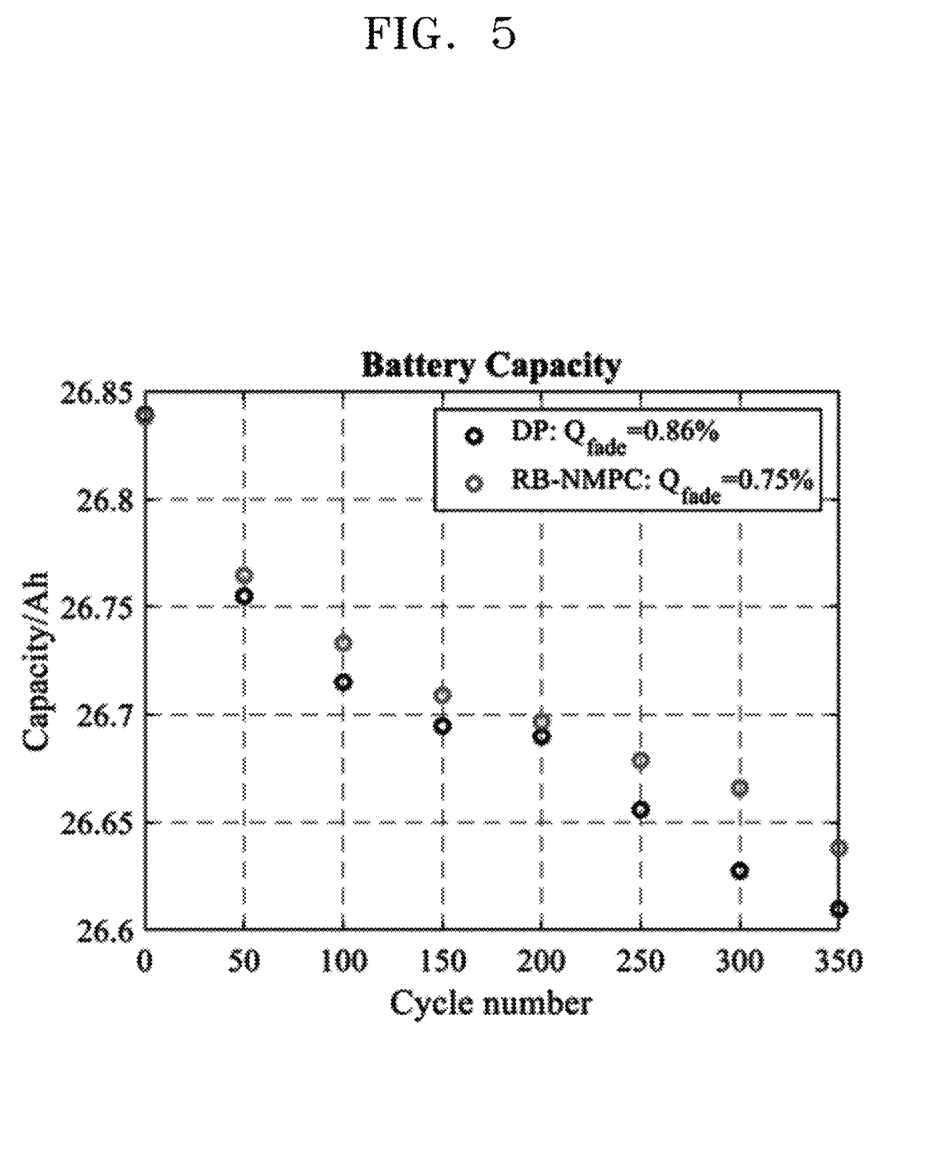
FIG. 5 is a graph showing results of a verification experiment on the apparatus for controlling energy for a hybrid electric vehicle according to the first embodiment, the apparatus being built into a battery-in-the-loop (BIL) system.

FIG. 1 is a block diagram illustrating a configuration of the apparatus for controlling energy for a hybrid electric vehicle according to a first embodiment of the present disclosure. FIG. 2 is a table showing variables optimized for a hybrid electric vehicle employing an in-parallel P0+P2 structure in the apparatus for controlling energy for a hybrid electric vehicle according to the first embodiment. FIG. 3 is a table showing variables optimized for the hybrid electric vehicle employing an in-parallel P1+P2 structure in the apparatus for controlling energy for a hybrid electric vehicle according to the first embodiment. FIG. 4 is a comparative table showing results of simulation of control that is performed by the apparatus for controlling energy for a hybrid electric vehicle according to the first embodiment. FIG. 5 is a graph showing results of a verification experiment on the apparatus for controlling energy for a hybrid electric vehicle according to the first embodiment, the apparatus being built into a battery-in-the-loop (BIL) system.

As illustrated in FIG. 1, the apparatus for controlling energy for a hybrid electric vehicle according to the first embodiment of the present disclosure may include an input module 10, a memory 20, an output module 40, and a processor 30.

The input module 10 receives a traveling condition and a vehicular characteristic of the hybrid electric vehicle, as inputs.

Stored in the memory 20 may be an execution program and a parameter that are necessary for carrying out an energy management strategy. Information stored may be selected by the processor 30 whenever necessary.

That is, stored in the memory 20 are an operating system for operating the apparatus for controlling energy for a hybrid electric vehicle and various types of data that are generated while executing an application (a program or an applet). At this point, examples of the memory 20 may include a non-volatile memory, a volatile memory, a flash memory, a solid state drive (SSD), and the like. The processor 30 may perform data reading, recording, correcting, deleting, updating, and the like on the memory 20.

The output module 40 may output a torque distribution ratio, according to the energy management strategy.

The processor 30 may be operatively coupled to the input module 10, the memory 20, and the output module 40. Thus, in order to control overall operations of the apparatus for controlling energy for a hybrid electric vehicle, the processor 30 may perform various operations by uploading various programs stored in the memory 20 onto a RAM for execution.

At this point, the processor 30 is described as including only one CPU, but may include multiple CPUs (digital signal processors (DSP), systems on a chip (SoC), or the like).

Various implementation examples of the processors 30 include a DSP, a microprocessor, a time controller (TCON), and the like. However, the processor 30 is not limited thereto. The processor 30 may be defined as including, or as a term including, one or more of a central processing unit (CPU), a microcontroller unit (MPU), a controller, an application processor (AP), a communication processor (CP), and an ARM processor. In addition, as the processor 30, an SoC or a large-scale integration (LSI) circuit, in both of which a processing algorithm is embedded, may be used, and a field programmable gate array may be used.

That is, in order to carry out the energy management strategy, the processor 30 may receive the traveling condition and the vehicular characteristic, as inputs, through the input module 10 by executing the execution program. Then, the processor 30 may determine, based on a first control algorithm, whether or not the hybrid electric vehicle is drivable in an EV mode. In a case where the hybrid electric vehicle is drivable in the EV mode, the processor enables the hybrid electric vehicle to drive in the EV mode. In a case where the hybrid electric vehicle is not drivable in the EV mode, the processor 30 may determine a drive mode and a torque distribution ratio based on a second control algorithm and may output the determined drive mode and torque distribution ratio through the output module 40.

According to the present embodiment, the hybrid electric vehicle that carries out the energy management strategy is a parallel-type hybrid electric vehicle and employs one of the in-parallel P0+P2 structure and the in-parallel P1+P2 structure.

At this point, P0 refers to a structure where a motor is coupled to a belt drive starter generator according to a mounting position of the motor, representing a multiplication of an engine speed by a pulley ratio. In contrast, P1 refers to a structure where a motor is coupled to an engine crankshaft, representing that an engine speed and a rotational speed are the same. Additionally, P2 refers to a structure where a motor is coupled to a transmission input shaft.

First, based on a rule-based (RB) control algorithm, which is the first control algorithm, the processor 30 determines whether or not the hybrid electric vehicle is drivable in the EV mode.

At this point, in a case where a battery's SoC value has never been lower than a control variable $rb_{bod}$ (where the subscript bod stands for depth of discharge) and where a value of a required torque $T_{gb}$ is lower than a control variable $rb_{trq}$ (where the subscript trq stands for torque), the processor 30 may determine that the hybrid electric vehicle is drivable in the EV mode.

At this point, for a setting purpose, the control variable may be optimized according to the traveling condition, based on a genetic algorithm (GA) that is an optimization algorithm, taking into consideration a structure of the hybrid electric vehicle.

In addition, in order to safely use the battery, in a case where a voltage of the battery ranges from 2.5 V to 4.2 V, based on the first control algorithm, the processor 30 enables the hybrid electric vehicle to drive in the EV mode.

In this manner, in a case where the result of determining whether or not the hybrid electric vehicle is drivable indicates that the hybrid electric vehicle is drivable, the processor 30 enables the hybrid electric vehicle to drive in the EV mode. In the EV mode, the motor provides a required torque, and an engine is not used.

However, in a case where the result of determining whether or not the hybrid electric vehicle is drivable indicates that the hybrid electric vehicle is not drivable, the processor 30 may determine the drive mode and the torque distribution ratio based on a nonlinear model predictive control (NMPC) control algorithm, which is the second control algorithm, and may output the determined drive mode and torque distribution ratio through the output module 40.

That is, based on the second control algorithm, the processor 30 may compute a torque distribution ratio u through an objective function in which a cost function is minimized as shown in Equation 1, using a ROM-R2D-SPM that is a battery degradation model. In Equation 1, a prediction range $N_P$ is set to two seconds, and a time interval dt is set to one second.

$$J_{cost} = w_{fuel} \cdot \dot{m}_f + w_{sr} \cdot \left| j_{side}^{Li} \right| + \qquad \text{Equation 1}$$
$$w_{soc} \cdot \left| SOC_{initial} - SOC_{k+S_p} \right| + w_{const} \cdot \text{Constraints}$$

In this manner, a cost function $J_{cost}$ may be determined as the sum of a fuel consumption ratio $\dot{m}_f$, a side reaction ratio $j_{side}^{Li}$, an SOC maintenance condition $|SOC_{initial} - SOC_{final}|$, and a constraint (0 or 1) indicating whether or not an operating range of a constituent element is satisfied.

At this point, if the operating range of a constituent element is satisfied, the constraint is 0, and, otherwise, the constraint is 1.

The constituent elements here may include one or more of an engine, a toque of a motor, an angular velocity limit of the motor, a battery's SoC, an electric current, and a voltage.

In addition, the cost function $J_{cost}$ in Equation 1 is computed by multiplying each constituent element by a weighting variable w for achieving an importance balance among the constituent elements. The cost function $J_{cost}$ serves to ensure the importance balance among the constituent elements.

In Equation 1, because an SoC needs to approach an initial SoC over time, $w_{soc}$ is set to the same value as the time. $w_{const}$ is set to 1000, which is a high value, in such a manner that a constituent element operates within a safe range.

In Equation 1, for a setting purpose, weighting variables $W_{fuel}$ and $w_{sr}$ may be optimized according to the traveling condition (an urban dynamometer driving schedule (UDDS) or a highway fuel economy test (FWFET) cycle) based on the genetic algorithm (GA), taking into consideration the structure of the hybrid electric vehicle, and four variables may be optimized through 1600 generations.

For reference, the variables optimized for the hybrid electric vehicle employing the in-parallel P0+P2 structure are shown on the table in FIG. 2. In contrast, the variables optimized for the hybrid electric vehicle employing the in-parallel P1+P2 structure are shown in the table in FIG. 3.

In this manner, the objective function of NMPC is set in such a manner as to minimize the fuel consumption ratio and the battery's side reaction ratio. The reason for this is that the higher the side reaction ratio, the more SEI layer is generated, resulting in faster battery degradation. In addition, an SoC maintenance condition is added to ensure that a difference between an initial SoC and a final SoC is maintained to the lowest possible level. By doing so, the hybrid electric vehicle can be prevented from driving in the EV mode. A boundary condition is that all constituent elements of the hybrid electric vehicle should operate within a safe operating range.

The results of simulation of control that is performed by the apparatus for controlling energy for a hybrid electric vehicle according to the first embodiment are shown on the table in FIG. 4.

As illustrated in FIG. 4, when comparing results of RB-NMPC according to the first embodiment of the present disclosure with results of the NMPC, the dynamic programming (DP), and an RB-EMB provided by Autonomie RB, in terms of fuel efficiency, the RB-NMPC is impossible to perform in real time, but achieves a value that is closest to a result of the DP, which is the most optimal value. In addition, when the hybrid electric vehicle employing the in-parallel P0+P2 structure travels in town (in the UDDS), the RB-NMPC achieves fuel efficiency that is improved by 4.9%, compared with the Autonomie RB.

In addition, when the hybrid electric vehicle employing the in-parallel P0+P2 structure travels in town (in the UDDS), in terms of battery degradation, the RB-NMPC experiences a battery capacity loss that is reduced by 19.1%, compared with the DP.

As a result, in a case where an RB-NMPC algorithm according to the present embodiment is to be applied, the RB-NMPC algorithm is applicable in real time, and this application leads to not only an improvement in fuel efficiency, but also a reduction in battery degradation.

In addition, when a comparison is made between the hybrid electric vehicle employing the in-parallel P0+P2 structure and the hybrid electric vehicle employing the in-parallel P1+P2 structure, the latter has a better fuel efficiency than the former.

The reason for this is that a P1 motor in the hybrid electric vehicle employing the in-parallel P1+P2 structure does not use a belt while the hybrid electric vehicle employing the in-parallel P0+P2 structure uses a comparatively small-sized P0 motor coupled to the engine with a belt. As a result, the non-use of the belt by the P1 motor can reduce energy loss, and the P1 motor that has the same size as a P2 motor can be used to provide a drive torque.

The RB-NMPC achieves fuel efficiency that is improved by 16.3%, 12.0%, and 19.4%, compared with the cases of the Autonomie RB, the NMPC, and the DP, respectively. In addition, in terms of the battery degradation, the RB-NMPC experiences the lowest battery capacity loss, both when the in-parallel P0+P2 structure is employed and when the in-parallel P1+P2 structure is employed.

While traveling in town (in the UDDS), the hybrid electric vehicle employing the in-parallel P0+P2 structure and the hybrid electric vehicle employing the in-parallel P1+P2 structure experience respective capacity losses that are reduced by 19.1% and 32.7%, respectively, in the case of the RB-NMPC, compared with the case of the DP.

In addition, a performance verification experiment was conducted on a two-layer RB-NMPC control strategy carried out by the apparatus for controlling energy for a hybrid electric vehicle according to the first embodiment, the apparatus being built into the battery-in-the-loop (BIL) system. A comparison was made between the RB-NMPC and the DP every 50 cycles until the hybrid electric vehicle traveled in town (in the UDDS) for a total of 350 cycles. From FIG. 5, it can be seen that, as the results of the performance verification experiment, the battery capacity loss was reduced by 0.75% in the case of the RB-NMPC, compared with 0.85% in the case of the DP.

Consequently, from FIG. 5, it can be seen that a battery degradation phenomenon was delayed by 12.7% in the case of the RB-NMPC, compared with the case of the DP.

As described above, the apparatus for controlling energy for a hybrid electric vehicle according to the first embodiment of the present disclosure distributes an output resulting from considering the fuel efficiency of the hybrid electric vehicle and the battery degradation, using a two-layer rule-based control and a model predictive control algorithm. This distribution not only satisfies a safe operating condition of the constituent elements of the hybrid electric vehicle, but also precisely predicts and optimizes the battery degradation by applying the ROM-P2D-SPM that is the battery degradation model. As a result, fuel consumption can be minimized, and the battery degradation and computation time can be reduced.

Figure 6:
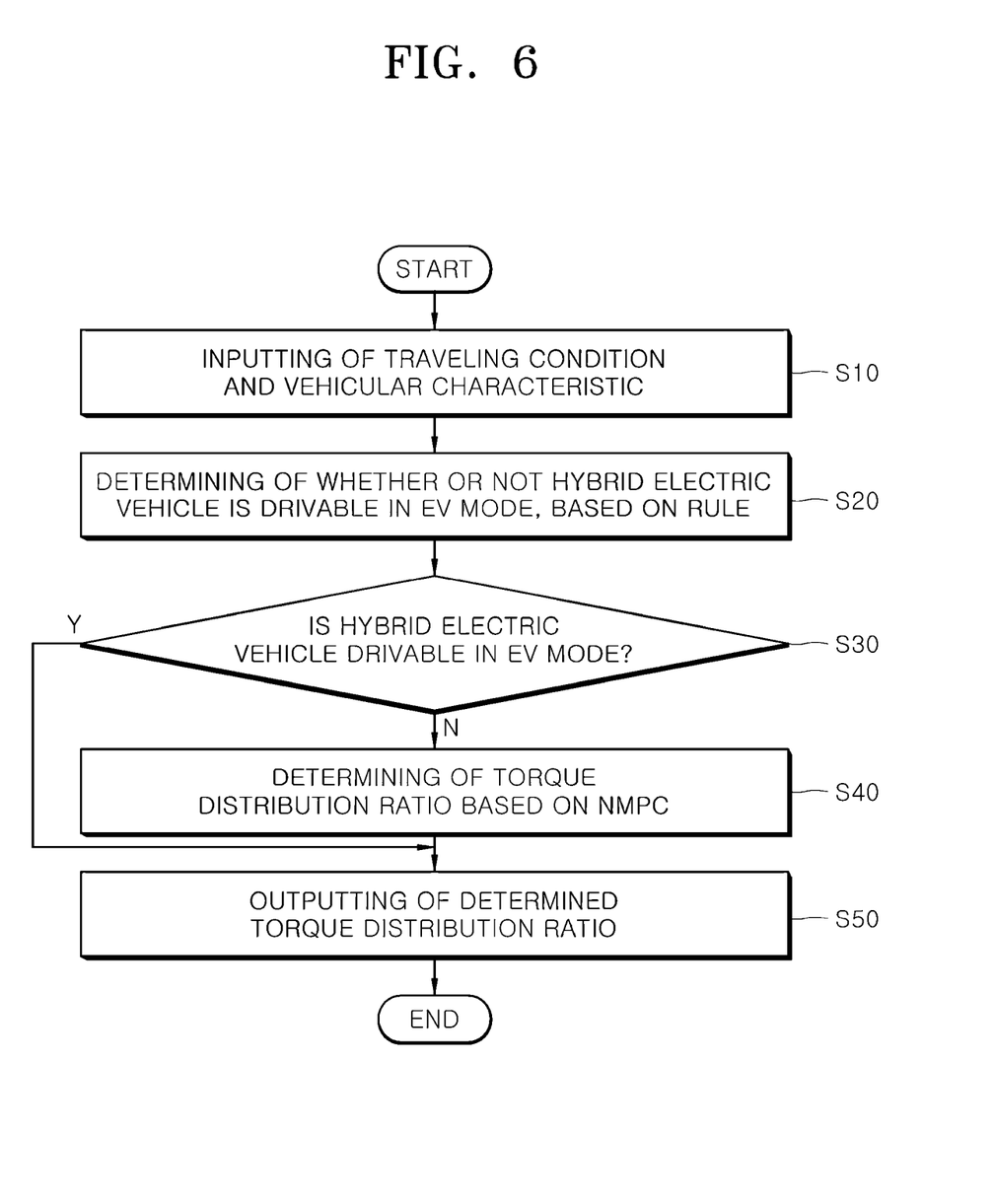
FIG. 6 is a flowchart that is referred to for description of a method of controlling energy for a hybrid electric vehicle according to a second embodiment of the present disclosure.

FIG. 6 is a flowchart that is referred to for description of a method of controlling energy for a hybrid electric vehicle according to a second embodiment of the present disclosure.

As illustrated in FIG. 6, in the method of controlling energy for a hybrid electric vehicle according to the second embodiment of the present disclosure, the processor 30 receives the traveling condition and the vehicular characteristic, as inputs, through the input module 10, according to the energy management strategy (S10).

After receiving the traveling condition and the vehicular characteristic in Step S10, as the inputs, the processor 30 determines whether or not the hybrid electric vehicle is drivable in the EV mode, based on the RB control algorithm, which is the first control algorithm (S20).

At this point, in the case where the battery's SoC value has never been lower than the control variable $rb_{bod}$ (where the subscript bod stands for depth of discharge) and where the value of the required torque $T_{gb}$ is lower than the control variable $rb_{trq}$ (where the subscript trq stands for torque), the processor 30 may determine that the hybrid electric vehicle is drivable in the EV mode.

At this point, for the setting purpose, the control variable may be optimized according to the traveling condition, based on the genetic algorithm (GA) that is the optimization algorithm, taking into consideration the structure of the hybrid electric vehicle.

In the case where the result of determining in Step S20 whether or not the hybrid electric vehicle is drivable indicates that the hybrid electric vehicle is drivable (S30), the processor 30 enables the hybrid electric vehicle to drive in the EV mode (S50).

At this time, in order to safely use the battery, in the case where the voltage of the battery ranges from 2.5 V to 4.2 V, based on the first control algorithm, the processor 30 enables the hybrid electric vehicle to drive in the EV mode.

In the case where the result of determining in Step S30 whether or not the hybrid electric vehicle is drivable indicates that the hybrid electric vehicle is not drivable, the processor 30 may determine the drive mode and the torque distribution ratio based on the nonlinear model predictive control (NMPC) control algorithm, which is the second control algorithm (S40).

That is, based on the second control algorithm, the processor 30 may compute the torque distribution ratio u through the objective function in which the cost function is minimized as shown in Equation 1, using the ROM-R2D-SPM that is the battery degradation model. In Equation 1, a prediction range $N_P$ is set to two seconds, and a time interval dt is set to one second.

$$J_{cost} = w_{fuel} \cdot \dot{m}_f + w_{sr} \cdot \left| j_{side}^{Li} \right| + w_{soc} \cdot \left| SOC_{initial} - SOC_{k+N_p} \right| + w_{const} \cdot \text{Constraints} \quad \text{Equation 1}$$

In this manner, a cost function $J_{cost}$ may be determined as the sum of a fuel consumption ratio $\dot{m}_f$, a side reaction ratio $j_{side}^{Li}$, an SOC maintenance condition $|SOC_{initial} - SOC_{final}|$, and a constraint (0 or 1) indicating whether or not an operating range of a constituent element is satisfied.

At this point, if the operating range of a constituent element is satisfied, the constraint is 0, and, otherwise, the constraint is 1.

The constituent elements here may include one or more of an engine, a toque of a motor, an angular velocity limit of the motor, a battery's SoC, an electric current, and a voltage.

In addition, the cost function $J_{cost}$ in Equation 1 is computed by multiplying each constituent element by the weighting variable w for achieving the importance balance among the constituent elements. The cost function $J_{cost}$ serves to ensure the importance balance among the constituent elements.

In Equation 1, because an SoC needs to approach an initial SoC over time, $w_{soc}$ is set to the same value as the time. $w_{const}$ is set to 1000, which is a high value, in such a manner that a constituent element operates within a safe range.

In Equation 1, for the setting purpose, the weighting variables $W_{fuel}$ and $w_{sr}$ may be optimized according to the traveling condition (the urban dynamometer driving schedule (UDDS) or the highway fuel economy test (FWFET) cycle) based on the genetic algorithm (GA), taking into consideration the structure of the hybrid electric vehicle, and four variables may be optimized through 1600 generations.

In this manner, the objective function of NMPC is set in such a manner as to minimize the fuel consumption ratio and the battery's side reaction ratio. The reason for this is that the higher the side reaction ratio, the more SEI layer is generated, resulting in faster battery degradation. In addition, the SoC maintenance condition is added to ensure that the difference between the initial SoC and the final SoC is maintained to the lowest possible level. By doing so, the hybrid electric vehicle can be prevented from driving in the EV mode. The boundary condition is that all constituent elements of the hybrid electric vehicle should operate within the safe operating range.

In Step S40, the processor 30 determines the drive mode and the torque distribution ratio based on the nonlinear model predictive control (NMPC) that is the second control algorithm. Then, the processor 30 outputs the determined drive mode and torque distribution ratio (S50).

As described above, the method of controlling energy for a hybrid electric vehicle according to the second embodiment of the present disclosure distributes an output resulting from considering the fuel efficiency of the hybrid electric vehicle and the battery degradation using the two-layer rule-based control and the model predictive control algorithm. This distribution not only satisfies the safe operating condition of the constituent elements of the hybrid electric vehicle, but also precisely predicts and optimizes the battery degradation by applying the ROM-P2D-SPM that is the battery degradation model. As a result, the fuel consumption can be minimized, and the battery degradation and computation time can be reduced.

Features of the present disclosure, which are described in the present specification, may be realized in the form of, for example, a method, a process, an apparatus, a software program, a data stream, or a signal. The features, although described in terms of realization in a single form (for example, described as only in the form of a method), may also be realized in a different form (for example, in the form of an apparatus or a program). The apparatus may be implemented in the form of adequate hardware, software, firmware, or the like. The method may be realized in, for example, a computer or a device, such as a microprocessor or a processor that usually refers to an integrated circuit or a processing device, such as a programmable logic device. Examples of the apparatus also include a computer and a communication device, such as a cellular phone or a portable/personal information terminal (a personal digital assistant ("PDA"), that facilitate communication of information between end users.

The embodiments of the present disclosure are described only in an exemplary manner with reference to the drawings. It would be understandable by a person of ordinary skill in the art to which the present disclosure pertains that various modifications may possibly be made to the embodiments and that various equivalents thereof may possibly be implemented.

Therefore, the legitimate technical scope of the present disclosure should be defined by the following claims.

What is claimed is:

1. An apparatus for controlling energy for a hybrid electric vehicle, the apparatus comprising:
 a memory configured to store an execution program and a parameter that are necessary for carrying out an energy management strategy; and
 a processor operatively coupled to the memory,
 wherein the processor receives a traveling condition and a vehicular characteristic of the hybrid electric vehicle according to the energy management strategy, and then determines, based on a first control algorithm, whether the hybrid electric vehicle is drivable in an electric vehicle (EV) mode,
 wherein the processor controls the hybrid electric vehicle based on the determination of whether the hybrid electric vehicle is drivable in the EV mode such that:

upon determining that the hybrid electric vehicle is drivable in the EV mode, the hybrid electric vehicle drives in the EV mode; and upon determining that the hybrid electric vehicle is not drivable in the EV mode, the processor determines and outputs a drive mode and a torque distribution ratio based on a second control algorithm and the hybrid electric vehicle drives in the drive mode with the torque distribution ratio, and wherein the first control algorithm is a rule-based (RB) control algorithm, and the second control algorithm is a nonlinear model predictive control (NMPC) control algorithm.

2. The apparatus of claim 1, wherein the hybrid electric vehicle employs one of an in-parallel P0+P2 structure and an in-parallel P1+P2 structure.

3. The apparatus of claim 1, wherein, in a case where a battery's SoC value has never been lower than a control variable $rb_{bod}$ (where the subscript bod stands for depth of discharge) and where a value of a required torque is lower than a control variable $rb_{trg}$ (where the subscript trq stands for torque), the processor determines that the hybrid electric vehicle is drivable in the EV mode.

4. The apparatus of claim 3, wherein, for a setting purpose, the control variable is optimized according to the traveling condition based on a genetic algorithm (GA) that is an optimization algorithm, taking into consideration a structure of the hybrid electric vehicle.

5. The apparatus of claim 1, wherein, based on the second control algorithm, the processor computes the torque distribution ratio through an objective function in which a cost function is minimized, using a ROM-R2D-SPM that is a battery degradation model.

6. The apparatus of claim 5, wherein the cost function is a sum of a fuel consumption ratio, a side reaction ratio, an SOC maintenance condition, and a constraint (0 or 1) indicating whether or not an operating range of a constituent element is satisfied.

7. The apparatus of claim 6, wherein the constituent elements include one or more of an engine, a torque of a motor, an angular velocity limit of the motor, a battery's SoC, an electric current, and a voltage.

8. The apparatus of claim 6, wherein the cost function is computed by multiplying each of the constituent elements by a weighting variable for achieving an importance balance among the constituent elements, the cost function serving to ensure the importance balance among the constituent elements.

9. The apparatus of claim 8, wherein, for a setting purpose, the weighting variable is optimized according to the traveling condition based on a genetic algorithm (GA) that is an optimization algorithm, taking into consideration a structure of the hybrid electric vehicle.

10. A method of controlling energy for a hybrid electric vehicle, the method comprising:

receiving, by a processor, a traveling condition and a vehicular characteristic of the hybrid electric vehicle according to an energy management strategy;

determining, by the processor, whether the hybrid electric vehicle is drivable in an electric vehicle (EV) mode, based on a first control algorithm;

controlling, by the processor, the hybrid electric vehicle based on the determination of whether the hybrid electric vehicle is drivable in the EV mode such that:

upon determining that the hybrid electric vehicle is drivable in the EV mode the hybrid electric vehicle drives in the EV mode; and upon determining that the hybrid electric vehicle is not drivable in the EV mode the processor determines and outputs a drive mode and a torque distribution ratio based on a second control algorithm and the hybrid electric vehicle drives in the drive mode with the torque distribution ratio, wherein the first control algorithm is a rule-based (RB) control algorithm, and the second control algorithm is a nonlinear model predictive control (NMPC) control algorithm.

11. The method of claim 10, wherein in the determining by the processor of whether or not the hybrid electric vehicle is drivable in the EV mode, in a case where a battery's SoC value has never been lower than a control variable $rb_{bod}$ (where the subscript bod stands for depth of discharge) and where a value of a required torque is lower than a control variable $rb_{trq}$ (where the subscript trq stands for torque), the processor determines that the hybrid electric vehicle is drivable in the EV mode.

12. The method of claim 11, wherein, for a setting purpose, the control variable is optimized according to the traveling condition based on a genetic algorithm (GA) that is an optimization algorithm, taking into consideration a structure of the hybrid electric vehicle.

13. The method of claim 10, wherein in the determining and outputting by the processor of the drive mode and the torque distribution ratio, based on the second control algorithm, the processor computes the torque distribution ratio through an objective function in which a cost function is minimized, using a ROM-R2D-SPM that is a battery degradation model.

14. The method of claim 13, wherein the cost function is a sum of a fuel consumption ratio, a side reaction ratio, an SOC maintenance condition, and a constraint (0 or 1) indicating whether or not an operating range of a constituent element is satisfied.

15. The method of claim 14, wherein the constituent elements include one or more of an engine, a torque of a motor, an angular velocity limit of the motor, a battery's SoC, an electric current, and a voltage.

16. The method of claim 14, wherein the cost function is computed by multiplying each of the constituent elements by a weighting variable for achieving an importance balance among the constituent elements, the cost function serving to ensure the importance balance among the constituent elements.

17. The method of claim 16, wherein, for a setting purpose, the weighting variable is optimized according to the traveling condition based on a genetic algorithm (GA) that is an optimization algorithm that varies with a structure of the hybrid electric vehicle.

18. The method of claim 10, wherein the hybrid electric vehicle employs one of an in-parallel P0+P2 structure and an in-parallel P1+P2 structure.

* * * * *